US010873521B2

(12) United States Patent
Guim Bernat et al.

(10) Patent No.: US 10,873,521 B2
(45) Date of Patent: Dec. 22, 2020

(54) METHODS AND APPARATUS FOR SDI SUPPORT FOR FAST STARTUP

(71) Applicant: INTEL CORPORATION, Santa Clara, CA (US)

(72) Inventors: Francesc Guim Bernat, Barcelona (ES); Susanne M. Balle, Hudson, NH (US); Daniel Rivas Barragan, Cologne (DE); John Chun Kwok Leung, Folsom, CA (US); Suraj Prabhakaran, Aachen (DE); Murugasamy K. Nachimuthu, Beaverton, OR (US); Slawomir Putyrski, Gdynia (PL)

(73) Assignee: INTEL CORPORATION, Santa Clara, CA (US)

( * ) Notice: Subject to any disclaimer, the term of this patent is extended or adjusted under 35 U.S.C. 154(b) by 467 days.

(21) Appl. No.: 15/655,872

(22) Filed: Jul. 20, 2017

(65) Prior Publication Data

US 2018/0027067 A1 Jan. 25, 2018

Related U.S. Application Data

(60) Provisional application No. 62/427,268, filed on Nov. 29, 2016, provisional application No. 62/423,727, (Continued)

(51) Int. Cl.
*H04L 12/26* (2006.01)
*H04L 12/24* (2006.01)

(Continued)

(52) U.S. Cl.
CPC .......... *H04L 43/16* (2013.01); *G06F 16/2282* (2019.01); *G06F 16/2379* (2019.01); *H04L 41/0816* (2013.01); *H04L 41/0896* (2013.01); *H04L 41/12* (2013.01); *H04L 41/5025* (2013.01); *H04L 43/0876* (2013.01); *H04L 47/803* (2013.01); *H04L 67/10* (2013.01); *H04L 67/1031* (2013.01); *H04L 67/34* (2013.01); *H04Q 9/00* (2013.01); *H04L 41/16* (2013.01);

(Continued)

(58) Field of Classification Search
None
See application file for complete search history.

(56) References Cited

U.S. PATENT DOCUMENTS

2005/0135408 A1* 6/2005 Han ...................... H04L 12/413 370/445
2006/0149845 A1* 7/2006 Malin .................. H04L 67/322 709/228

(Continued)

*Primary Examiner* — Brian Whipple

(57) ABSTRACT

Techniques for fast startup for composite nodes in software-defined infrastructures (SDI) are described. A SDI system may include an SDI manager component, including one or more processor circuits to access one or more remote resources, the SDI manager component may including a node manager to determine, based upon one or more reservation tables stored in a non-transitory computer-readable storage medium, an initial set of resources for creating the composite node from among the one or more remote resources. The partition manager may create the composite node using the initial set of resources, the initial set of resources is a subset of resources required by the composite node. Other embodiments are described and claimed.

23 Claims, 19 Drawing Sheets

1800

Receive a request to create a composite node from an orchestrator component, the request including one or more fast startup parameters.

1802

Determine, based upon one or more reservation tables stored in a non-transitory computer-readable storage medium, an initial set of resources for creating the composite node from among the one or more remote resources.

1804

Create the composite node using the initial set of resources, the initial set of resources is a subset of resources required by the composite node

1806

Related U.S. Application Data filed on Nov. 17, 2016, provisional application No. 62/376,859, filed on Aug. 18, 2016, provisional application No. 62/365,969, filed on Jul. 22, 2016.

(51) Int. Cl.

| | |
|---|---|
| ***H04L 12/927*** | (2013.01) |
| ***H04L 29/08*** | (2006.01) |
| ***H04L 12/925*** | (2013.01) |
| ***G06F 16/22*** | (2019.01) |
| ***G06F 16/23*** | (2019.01) |
| ***H04Q 9/00*** | (2006.01) |

(52) U.S. Cl.

CPC ...... *H04L 41/5009* (2013.01); *H04L 41/5054* (2013.01); *H04L 43/0858* (2013.01); *H04L 43/0894* (2013.01); *H04L 47/722* (2013.01); *H04L 47/805* (2013.01); *H04Q 2209/20* (2013.01)

(56) References Cited

U.S. PATENT DOCUMENTS

2006/0205414 A1* 9/2006 Teague .................. H04L 5/0053 455/452.1
2010/0278119 A1* 11/2010 Potkonjak ............. G06F 9/5011 370/329
2012/0131579 A1* 5/2012 Pujolle ................ H04L 12/4641 718/1
2016/0266932 A1* 9/2016 Phelan ................ G06F 9/45533

* cited by examiner

*Data Center 100*

1800

METHODS AND APPARATUS FOR SDI SUPPORT FOR FAST STARTUP

RELATED APPLICATIONS

This application claims priority to U.S. Provisional Patent Application No. 62/427,268, filed Nov. 29, 2016; U.S. Provisional Patent Application No. 62/423,727, filed Nov. 17, 2016; U.S. Provisional Patent Application No. 62/376,859, filed Aug. 18, 2016; and U.S. Provisional Patent Application No. 62/365,969, filed Jul. 22, 2016; each of which is hereby incorporated by reference in its entirety.

BACKGROUND

Applications executed in a data center may use a set of resources in order to achieve a certain goal (e.g., process database queries performed by users). Applications may be sensitive to a subset of resources from all the resources available within a particular data center. For example a database within the data center may use processors, memory, disk, and fabric, but may be most sensitive to processor and memory availability and performance. Data center throughput may be increased by adding resources, such as memory and compute bandwidth and power. However, increasing other resources, such as fabric or disk may not provide a direct benefit to throughput. Furthermore, reduction of memory or compute bandwidth may have negative impact on throughput. Data center architectures have addressed the problem of mapping the correct amount of resources to the applications using applications requirements, which may be provided by the user or directly by the application, in order to do the proper resource selection and allocation. This process may include selecting the set of resources and also ensuring that certainty quantities and qualities such as the needed Quality of Service (QoS) are reserved to satisfy the requirements. However, in many data center architectures, such as those using software defined infrastructure, there are remaining challenges with respect to the correct allocation and management of resources. Accordingly, improved techniques for the management of resources within data center architectures are desirable.

DETAILED DESCRIPTION

Figure 1:
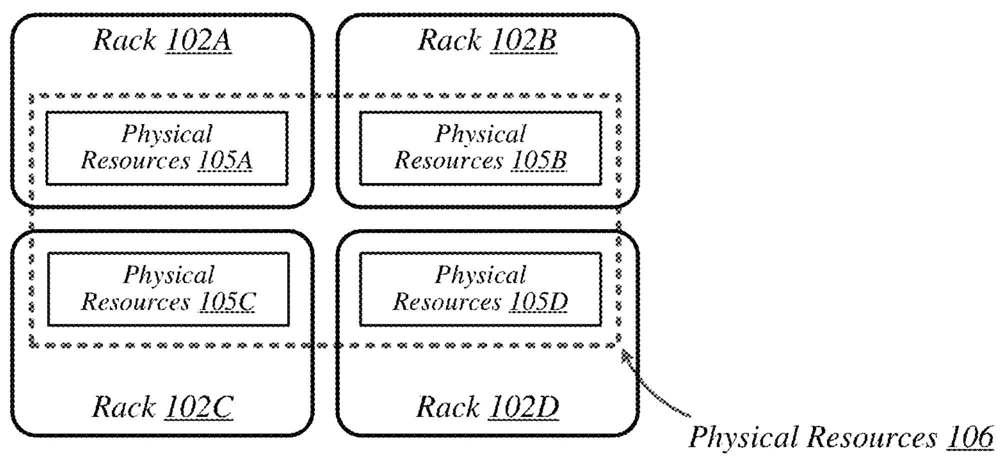
FIG. 1 illustrates an example of a data center.

Various embodiments are generally directed to techniques for management of software defined infrastructure (SDI) systems. In particular, some embodiments are directed to fast startup techniques that may allow applications to initialize on a first set of SDI resources and later take advantage of a second set of SDI resources as they become available to the applications.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given. The devices described herein may be any of a variety of types of computing devices, including without limitation, a server, a workstation, a data center, or the like.

In various embodiments, the aforementioned processors may include any of a wide variety of commercially available processors, including without limitation, an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the aforementioned storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, networks may be a single network possibly limited to extending within a single building or other relatively limited area, a combination of connected networks possibly extending a considerable distance, and/or may include the Internet. Thus, networks may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the aforementioned interfaces may include circuitry providing at least some of the requisite functionality to enable such coupling. However, the aforementioned interfaces may also be at least partially implemented with sequences of instructions executed by the processor elements (e.g., to implement a protocol stack or other features). Where one or more portions of the networks may employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the networks entail the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation. Furthermore, as used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
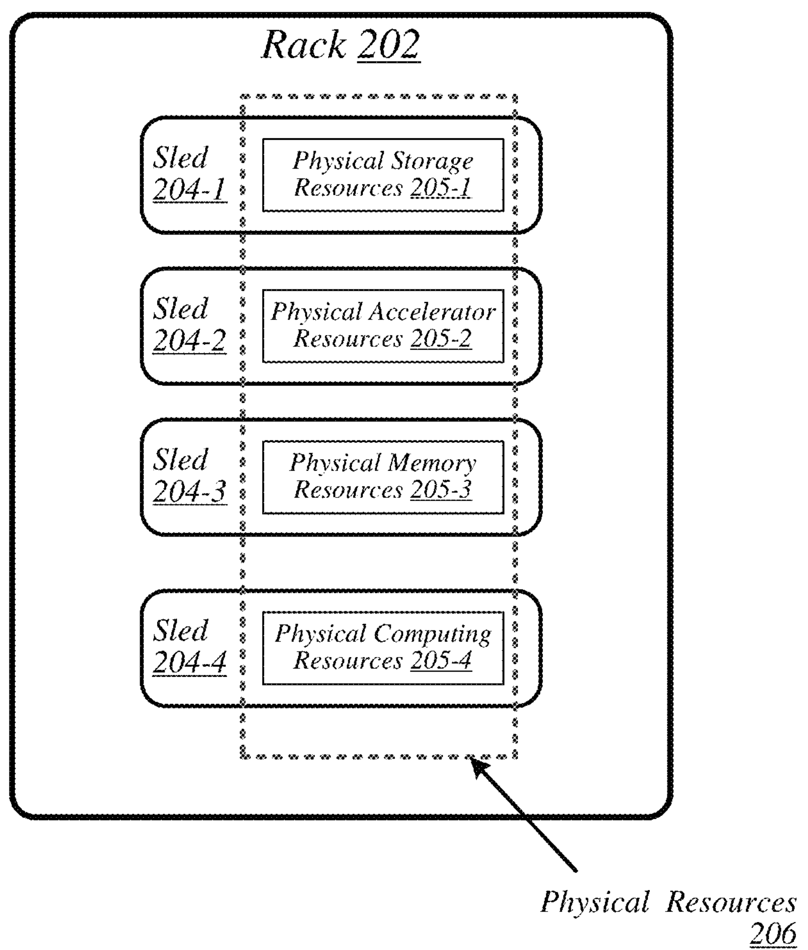
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
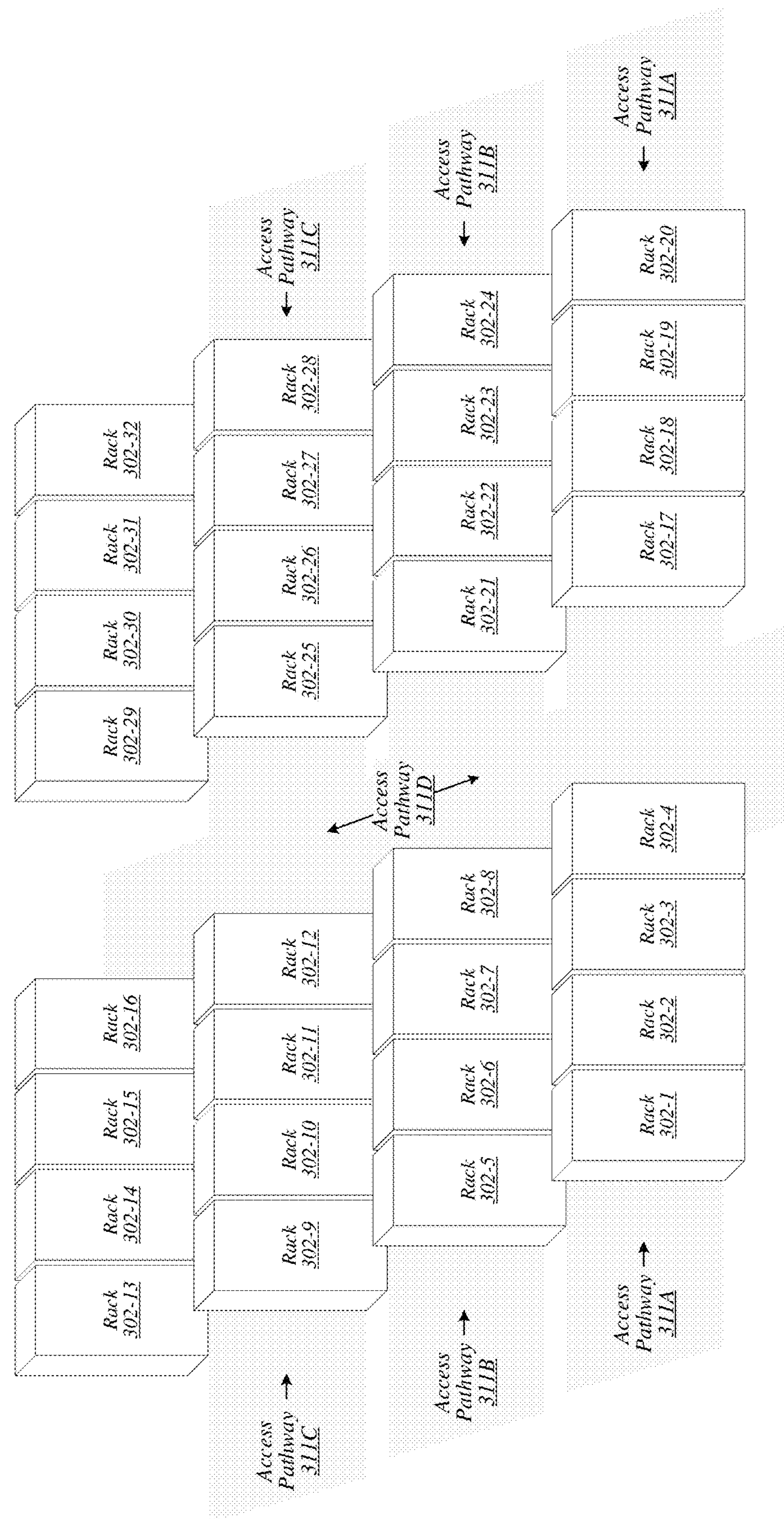
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
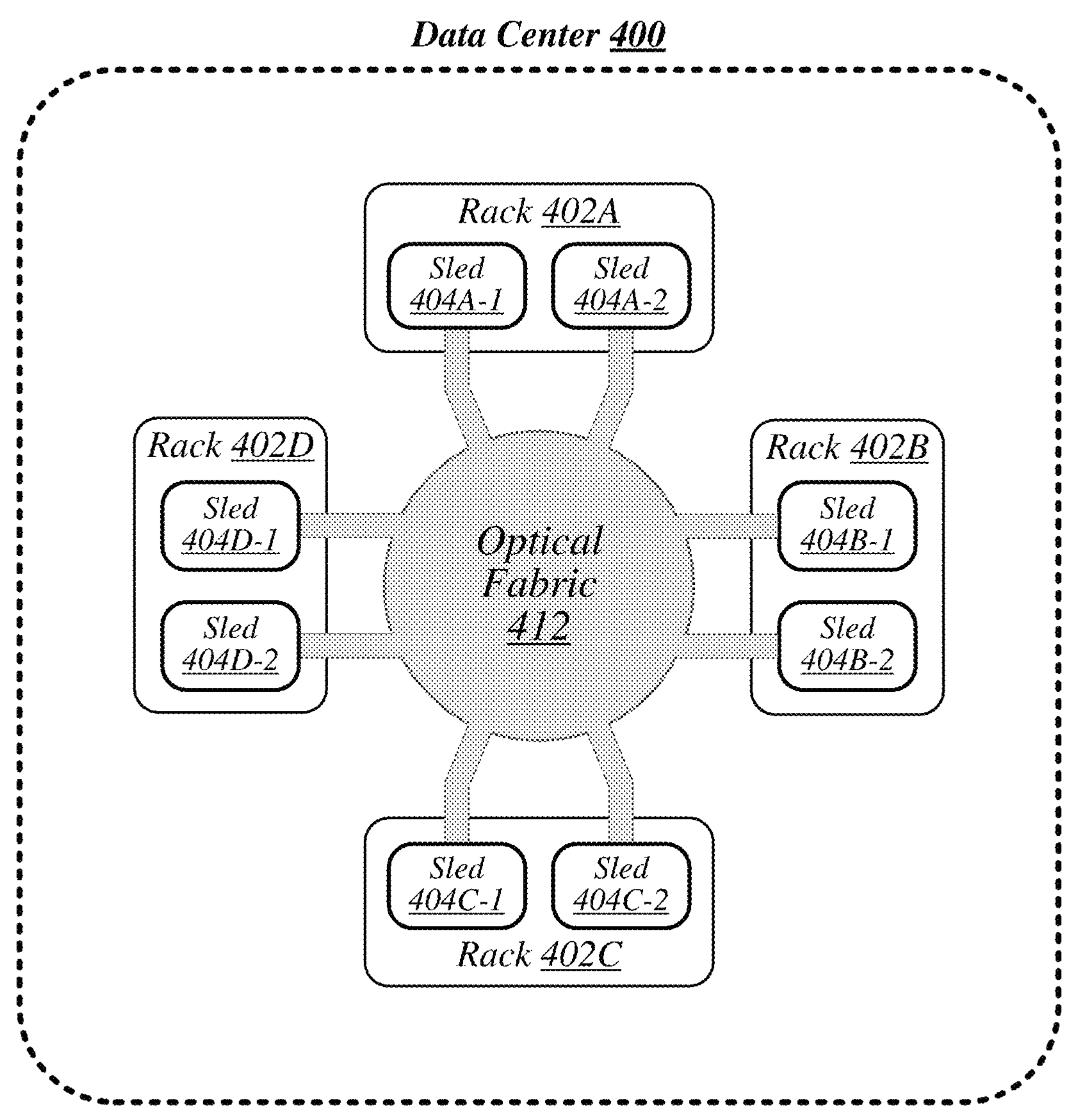
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
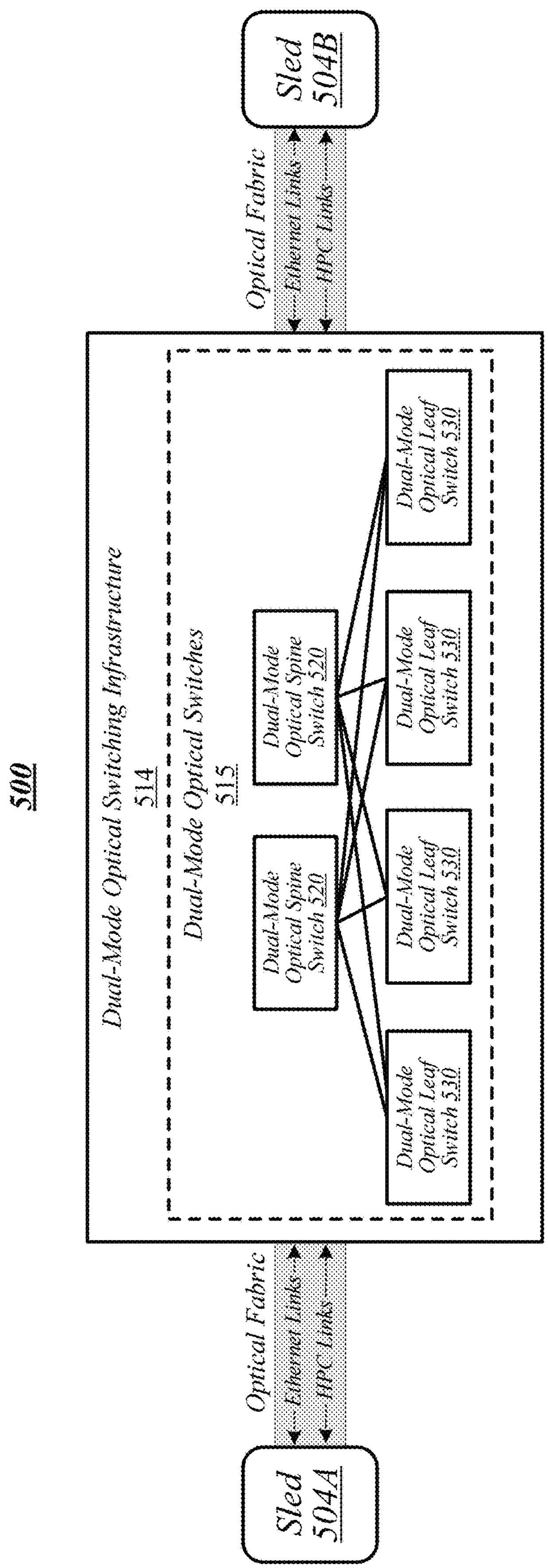
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
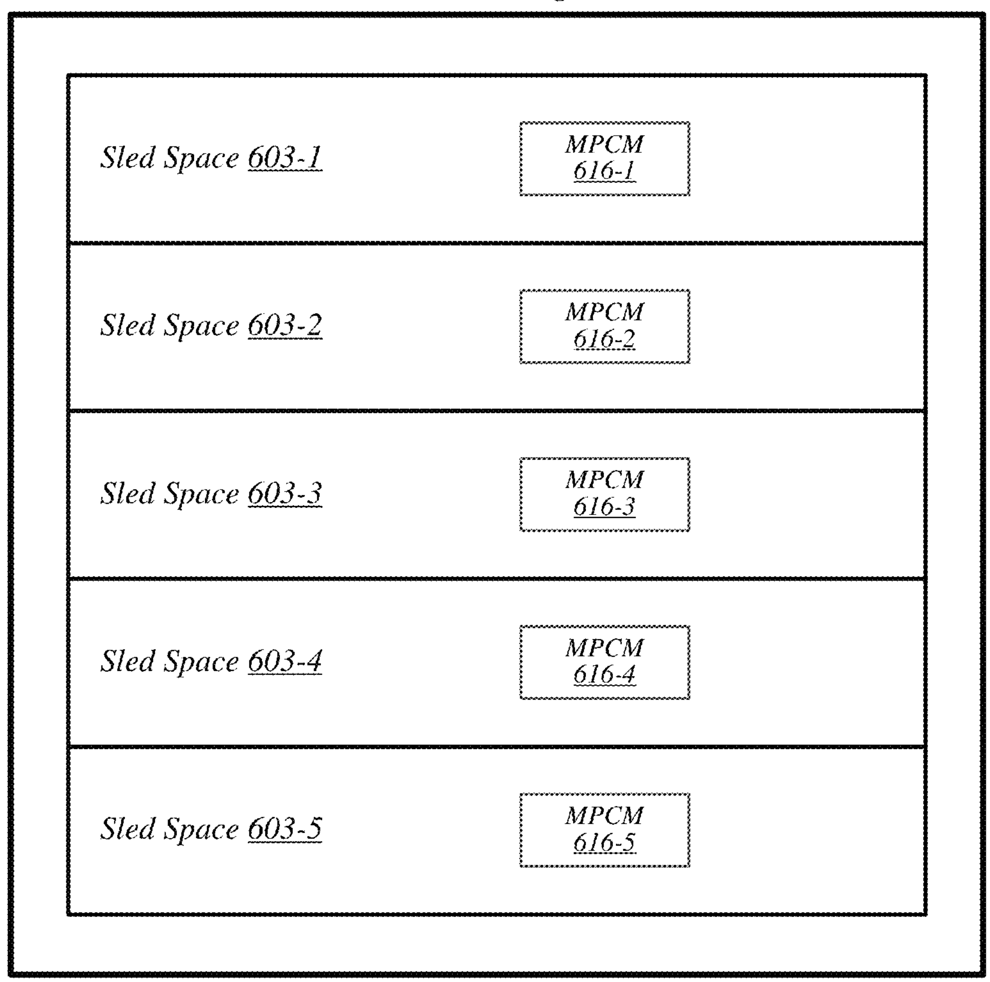
FIG. 6 illustrates and example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
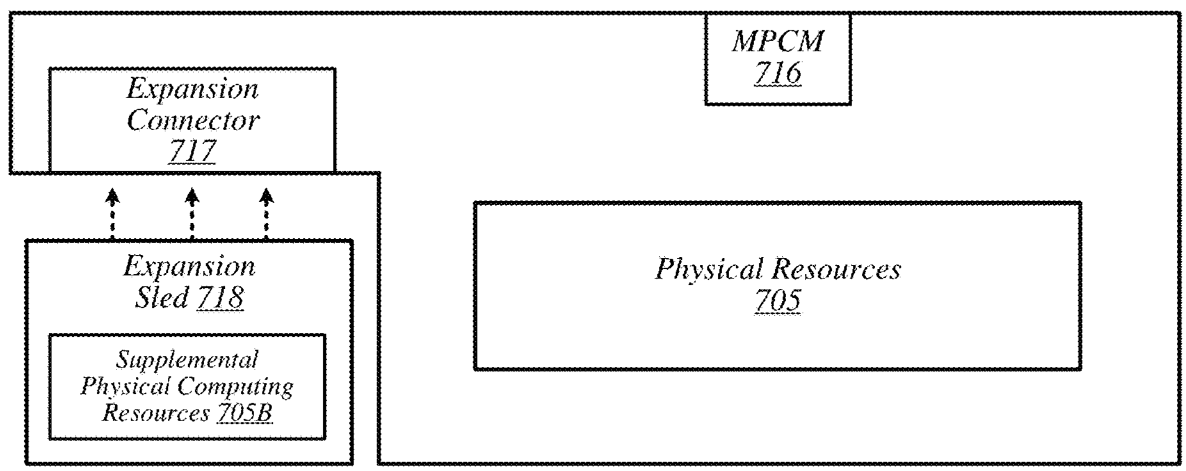
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
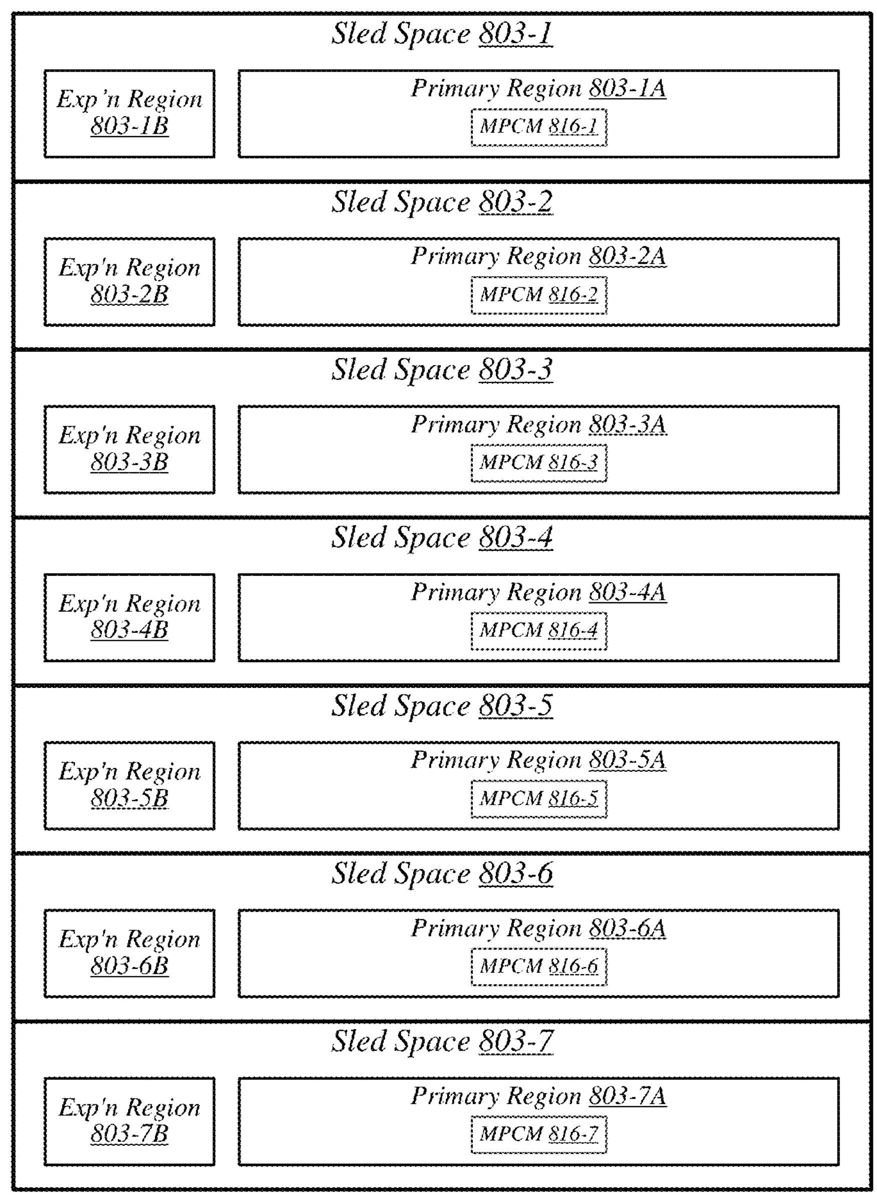
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
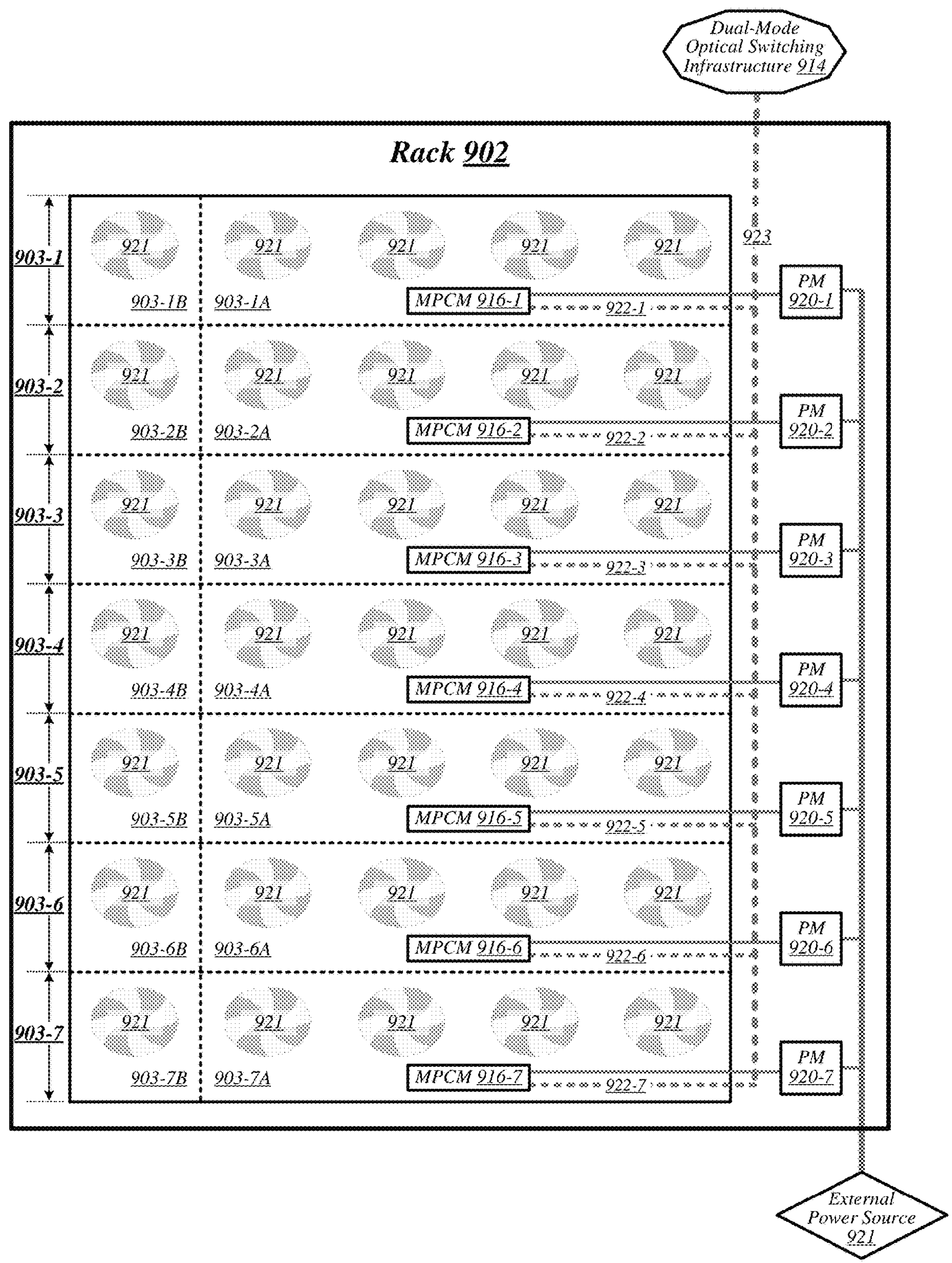
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
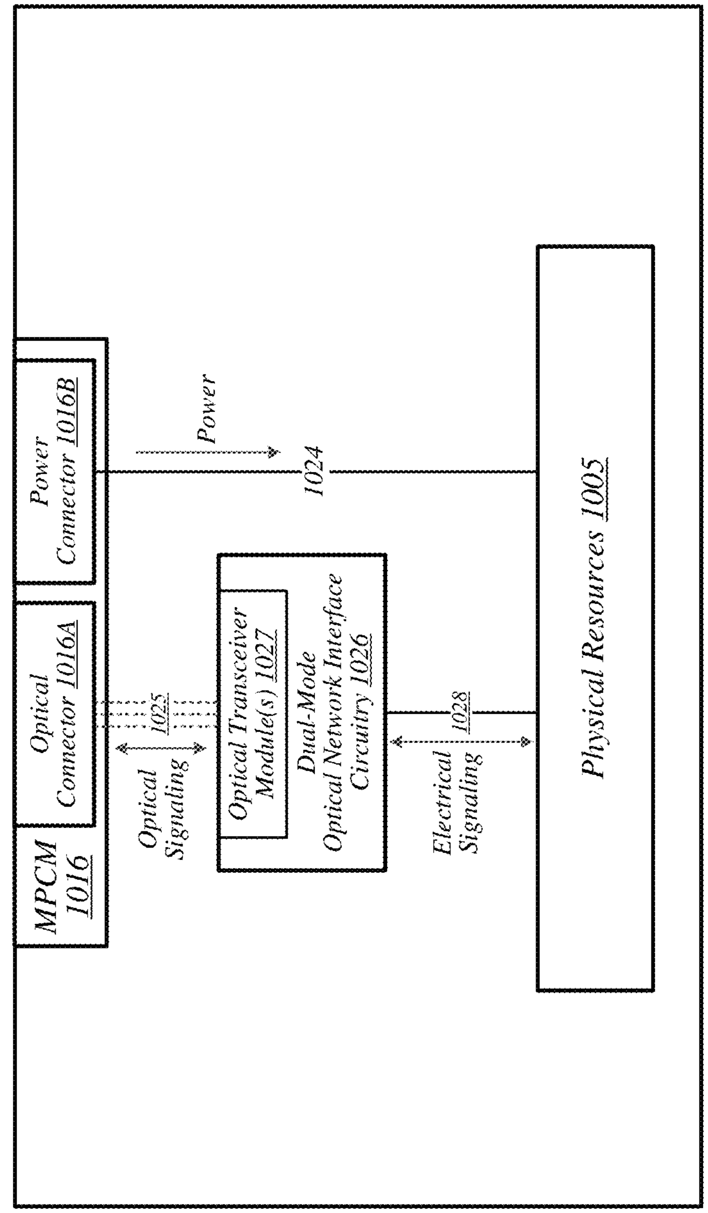
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
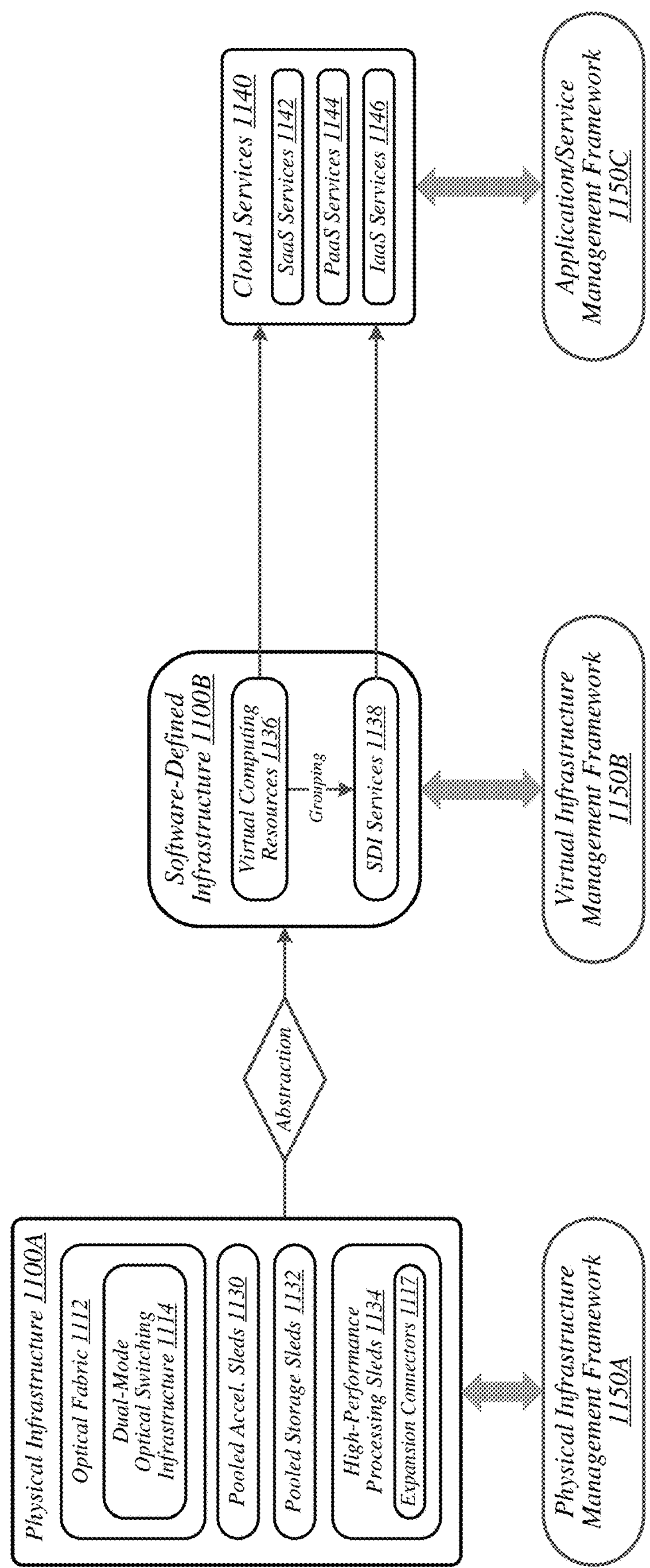
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
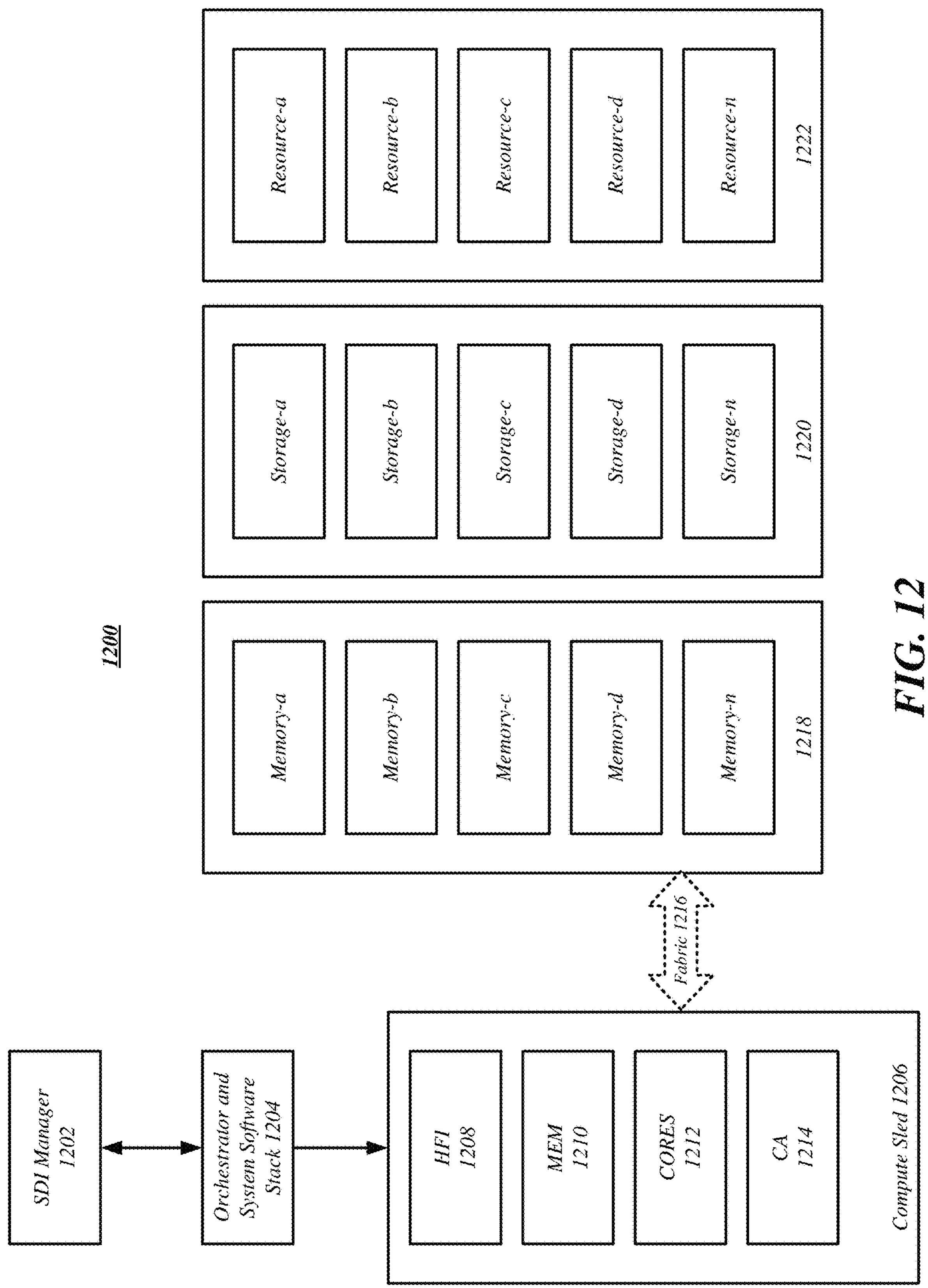
FIG. 12 illustrates a block diagram of a system according to an embodiment.

FIG. 12 illustrates a block diagram of a system according to an embodiment. System 1200 may be a SDI architecture, in which resources may be defined by applications, and composite nodes may be created from a set of available resources on an application-by-application basis. In some data centers, the resource selection and allocation for the application may be done by a resource manager, which may be operated separately from, or within, an orchestrator. Traditional architectures may be composed by a set of static platforms or nodes Ns={N1, . . . , Nm} that the resource manager may allocate to the application based upon characteristics, properties, and/or requirements. Each node may include a set of resources with a certain characteristics (i.e., performance, capacity, etc.). The data center may be composed at the same time by different nodes with different types of resources, for example.

Forthcoming data center architectures may be based on SDI, such as the architecture illustrated in FIG. 12. In SDI architectures, applications may be executed on top of a composite node, which may be dynamically created by the SDI manager 1202 (i.e., a Rack Scale Design Pod Manager, in some exemplary embodiments), or created based upon user or application instructions in some embodiments. A Rack Scale Design may include a hardware architecture that includes the ability to dynamically compose physical hardware resources into the most optimal configuration (e.g., composed or composite node) for each workload using an open application programming interface standard. These composite nodes, which may be composed by different resources that are disaggregated from the platform and distributed in different parts of the data center, may be virtualized to the application and are shown as an isolated and “local” resource. In other words, resources may be physically spread out remotely from a computing platform and connected via a fabric, as described herein.

In general terms, SDI architectures may expose a set of pools of resources, such as memory pool 1218, storage pool 1220, and resource pool 1222, each comprising one or more nodes of a given resource, to the orchestrator 1204 and system software stack 1204. Orchestrator 1204, based on user requests or application requests, may request to SDI manager 1204 to compose a node based on those requirements. The composed node may be defined by SDI manager 1202, as described in detail herein, and returned to orchestrator 1204. Once a composed node is defined by SDI manager 1202 and received by orchestrator 1204, an application may be booted and deployed on the composed node, which may include one or more resources from a compute sled 1206 and one or more resources from memory pool 1218, storage pool 1220, and resource pool 1222, connected via fabric 1216. While three exemplary pools are illustrated, it can be appreciated that more or less pools may be used in various embodiments. Further, resource pool 1222 may include one or more data center resources, such as field-programmable gate arrays (FPGAs), for example. Compute sled 1206 may include one or more components, such as Host Fabric Interconnect/Interface (HFI) node 1208, MEM memory node 1210, CORES processing node 1212, and caching agent (CA) node 1214, which may each be consistent with one or more of the embodiments described herein.

In an embodiment, CA node(s) 1214 may be the coherency agents within a node that process memory requests from the cores within the same node. Home Agents (HA) may be the node clusters that are responsible for processing memory requests from the CAs and may act as a home for part of the memory address space (one die may have multiple homes having a distributed address space mapping). Depending on the address space that requests are targeting, they may go to the same node’s local memory, they may go the Unified Path Interconnect (UPI) agent (formerly called QPI or KTI) to route the request to the other processors within the same coherent domain or they may go to processors through the Host Fabric Interface (HFI) that are outside the coherent domain. All the processors connected through UPI may belong to the same coherent domain. One system may be composed by one or more coherent domains being all the coherent domains connected through fabric interconnect. For example high-performance computing systems (HPC) or data centers may be composed by N clusters or servers that can communicate with each other using fabric 1216. Using the fabric 1216, each coherent domain may expose some address regions to the other coherent domains. However, accesses between different coherent domains may not be coherent. Some techniques described herein may assume that a fabric interconnect is used, such as Omni-Path, as described herein, which may allow mapping address of memory ranges between different coherent domains.

Figure 13:
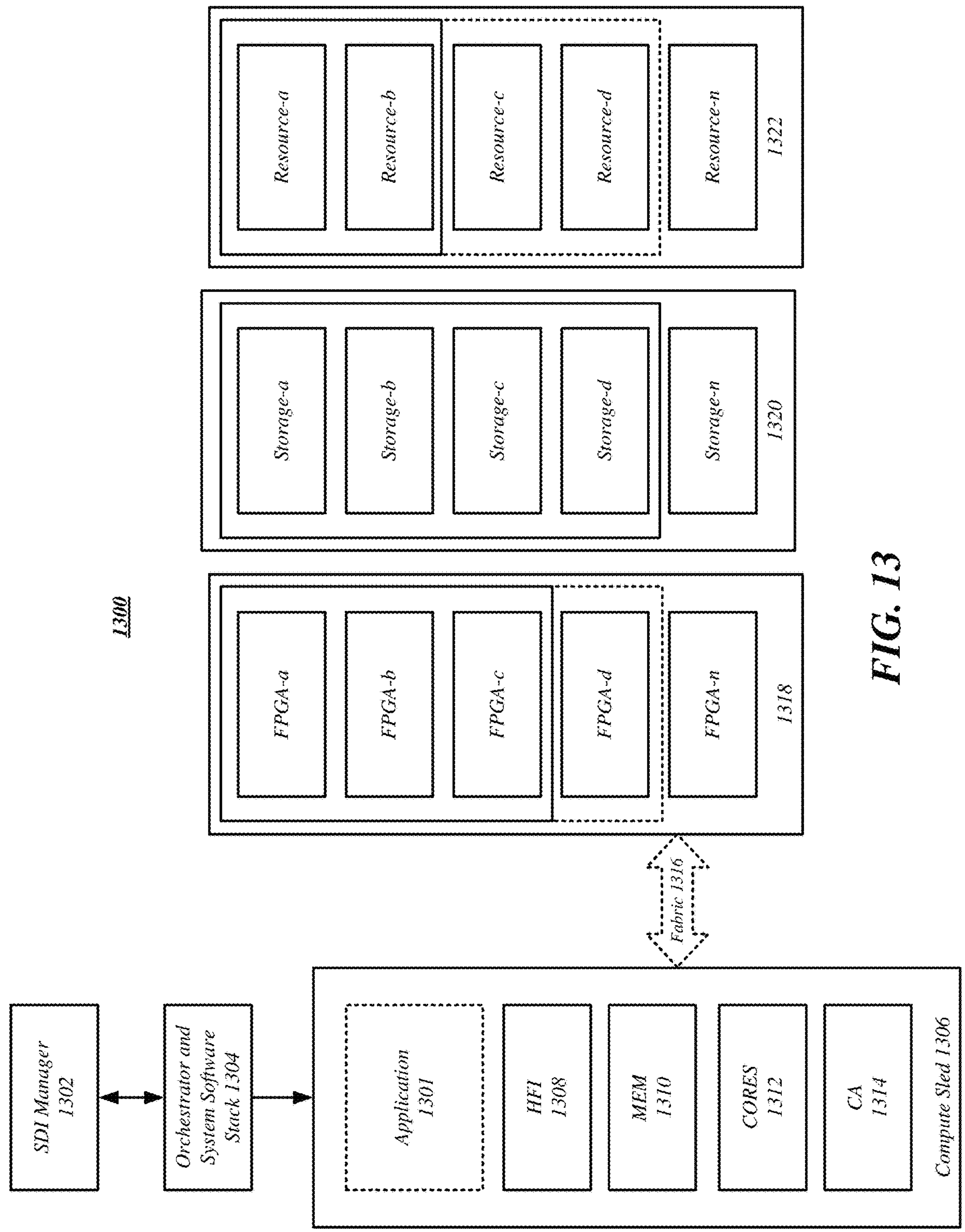
FIG. 13 illustrates a block diagram of a system according to an embodiment.

FIG. 13 illustrates a block diagram of a system according to an embodiment. As illustrated within FIG. 13, an SDI system 1300 (with like-numbered elements with respect to FIG. 12) may include an application 1301 running on compute sled 1306. As illustrated, application 1301 is running on a composed node, which may be defined by SDI manager 1302 to include compute sled 1306, three memory nodes from memory pool 1318, four storage nodes from storage pool 1320, and two resource nodes from resource pool 1322. Once the composite node is created, an OS may be booted in the node and the application may begin execution using the aggregated resources as if they were physically in the same node.

One exemplary advantage of SDI architectures is that resources can be added dynamically to the composite node as they become available. In an example illustrated with respect to FIG. 13, an application 1301 may require four units of FPGA, four units of storage, and four units of resources. However, if, for example, at submission time there are not enough resources available, such as in FIG. 13 where only three units of FPGA and only two units of resources are available, existing policies may delay the execution of application 1301 until all the resources needed by the application become available. This may significantly delay the startup of the application. For example, in certain market segments, such as in high-performance computing (HPC), applications may wait weeks to get all the required resources. This can also increase substantially the total cost of ownership (TCO) since the free resources may be reserved until the rest are released and can be assembled to the composite node where the application will be executed. Another possible scenario is that, even if the free resources are not immediately reserved while waiting, they cannot be assigned to any other application because all the waiting jobs have higher requirements. Thus, fast startup techniques may reduce the time needed to start some applications, and also reduce TCO while maximizing utilization of available resources.

According to the fast startup techniques described herein, a node may be composed with a subset of required resources, and later transitioned to full requirements as additional resources become available. The SDI manager 1302 may be responsible for adding the pending resources as they become available. In the previous example, the other FPGAs in 1318 as well as the resources 1322 may be allocated to the composite node as they become available. The new resources may registered to the software stack so they can become usable by the application. To provide a more complete solution, the user or orchestrator 1304 may provide requirements to select specific resources that need to be part of the composite node. For example, the FPGA may need to be placed in the same rack of the compute sled or "provide these specific resources." In this case, the SDI manager 1302 may mark the specific required resources (currently associated to another composite node) as virtually reserved to the new node (where application 1301 runs). Once the resources are released, they may be re-allocated instead of being pushed back to the resource of pools.

Figure 14:
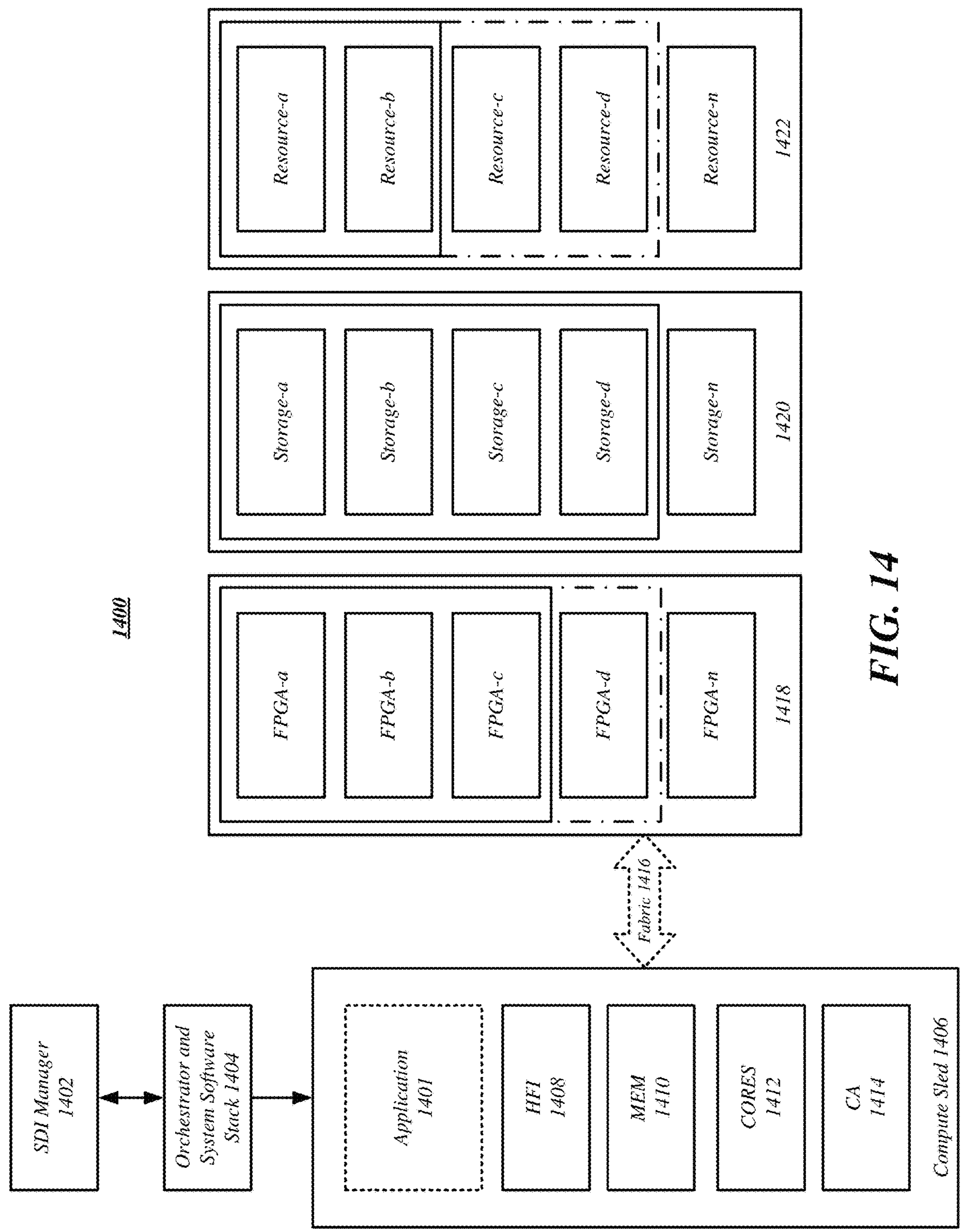
FIG. 14 illustrates a block diagram of a system according to an embodiment.
Figure 15:
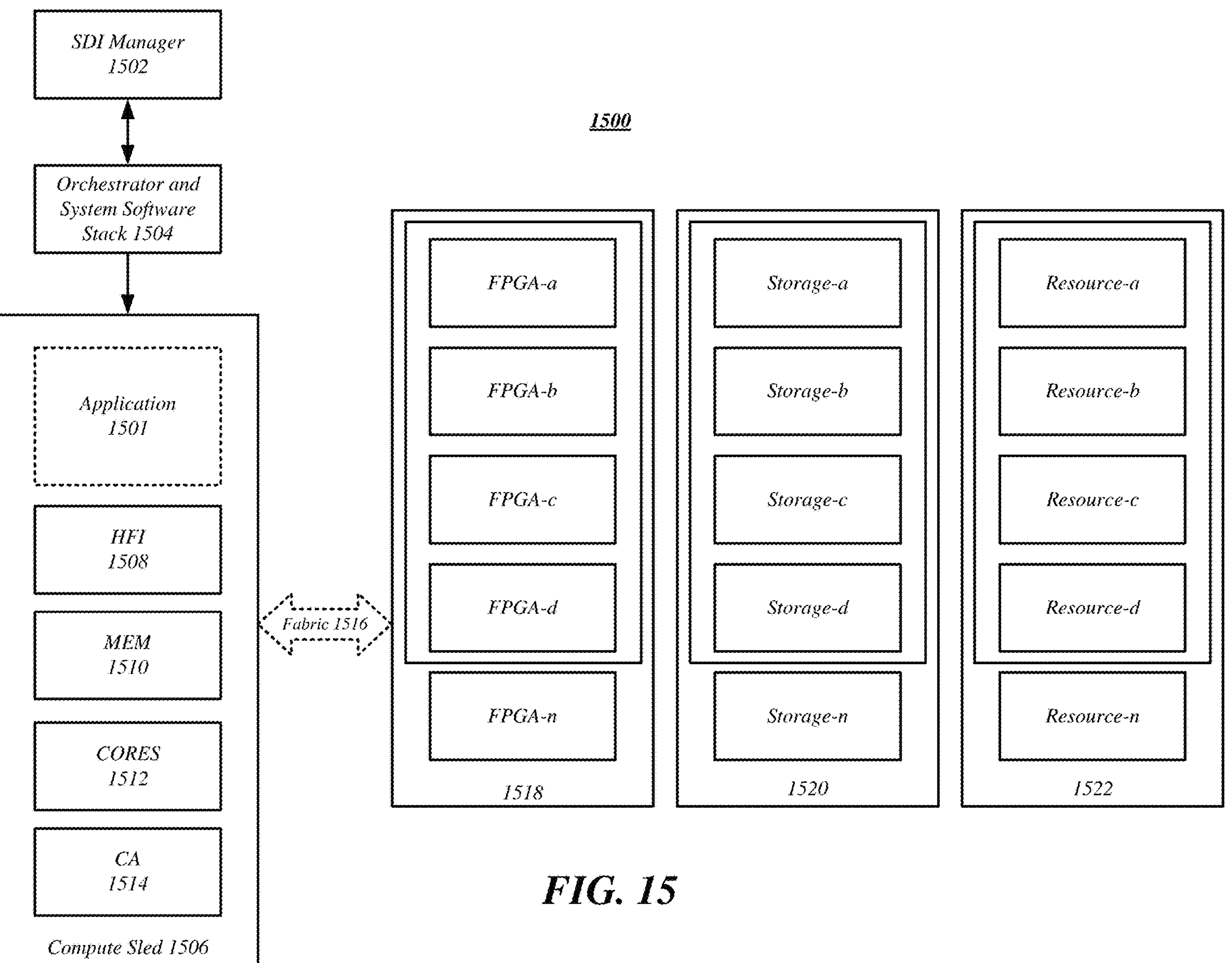
FIG. 15 illustrates a block diagram of a system according to an embodiment.

FIG. 14 and FIG. 15 illustrate block diagrams of a system according to an embodiment. As illustrated in FIG. 14, one additional FPGA from 1418 and two additional resources from 1422 are reserved for a composed node for an application 1401. And in FIG. 15, these reserved resources are given to a composed node for application 1501 when they have been released from a prior composite node. In this example, the orchestrator 1404 may require a fast startup to run application 1401 to the SDI manager 1402. Orchestrator 1404 may also provide a set of requirements that specify that all the resources of the same type must be in the same pool of resources, in one example. The SDI manager may decide to allocate the composite node in pools 1418, 1420, and 1422. The fast startup composite node may be created with the currently available resources and marks the remaining resources as reserved (dashed). When another application using the reserved resources finishes and its associated composite node is de-composed, SDI manager 1502 may associate the reserved resources to application 1501, which started without all the resources requested. At this point, the fast startup composite node becomes a regular composite node. In some embodiments, an interface may be present within compute sled 1506 to inform the operating system and/or hypervisor that new resources are available.

Figure 16:
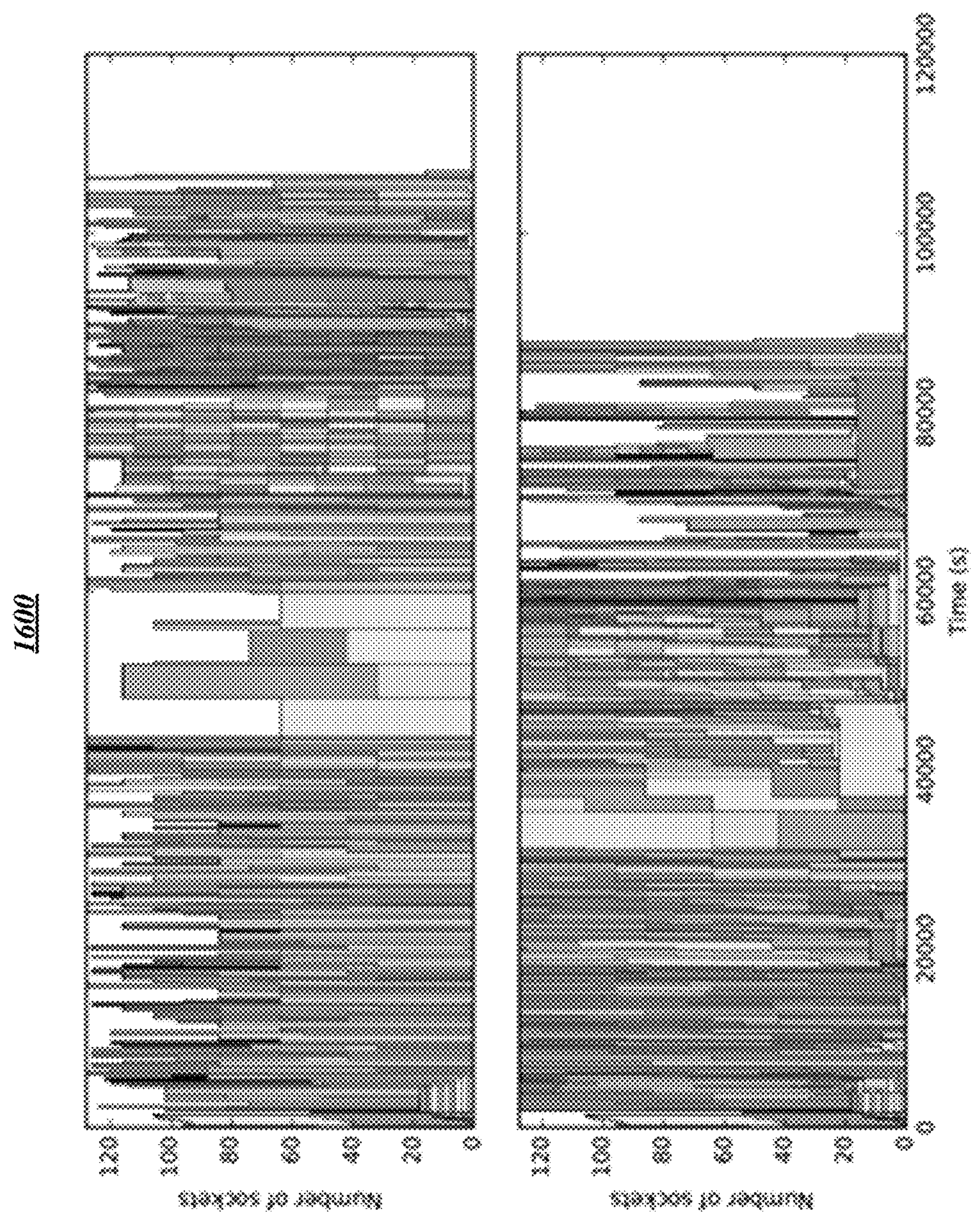
FIG. 16 illustrates an exemplary timing diagram according to an embodiment.

FIG. 16 illustrates an exemplary timing diagram 1600 according to an embodiment. Fast startup techniques described herein may allow for a substantial reduction on the TCO of the data center. First, applications that can take advantage of fast startup may begin execution sooner. Second, resources within the data center may be used more efficiently from a TCO perspective. In other words, resources that would be reserved for the future composite node or that would remain idle because no one else is using them, can now be used. FIG. 16 illustrates an example of how both TCO and the user service may improve by the usage of fast startup techniques. The top figure shows how long it takes to execute 1,000 jobs in a data center without fast startup and the bottom figure how long it takes with the fast startup. Although this is an exemplary result based on simulation, it can be seen how fast startup is able to reduce the total amount of required resources to execute 1,000 jobs. It also shows how the processors may be used effectively that would have otherwise remain just reserved until memory and compute become available.

Figure 17:
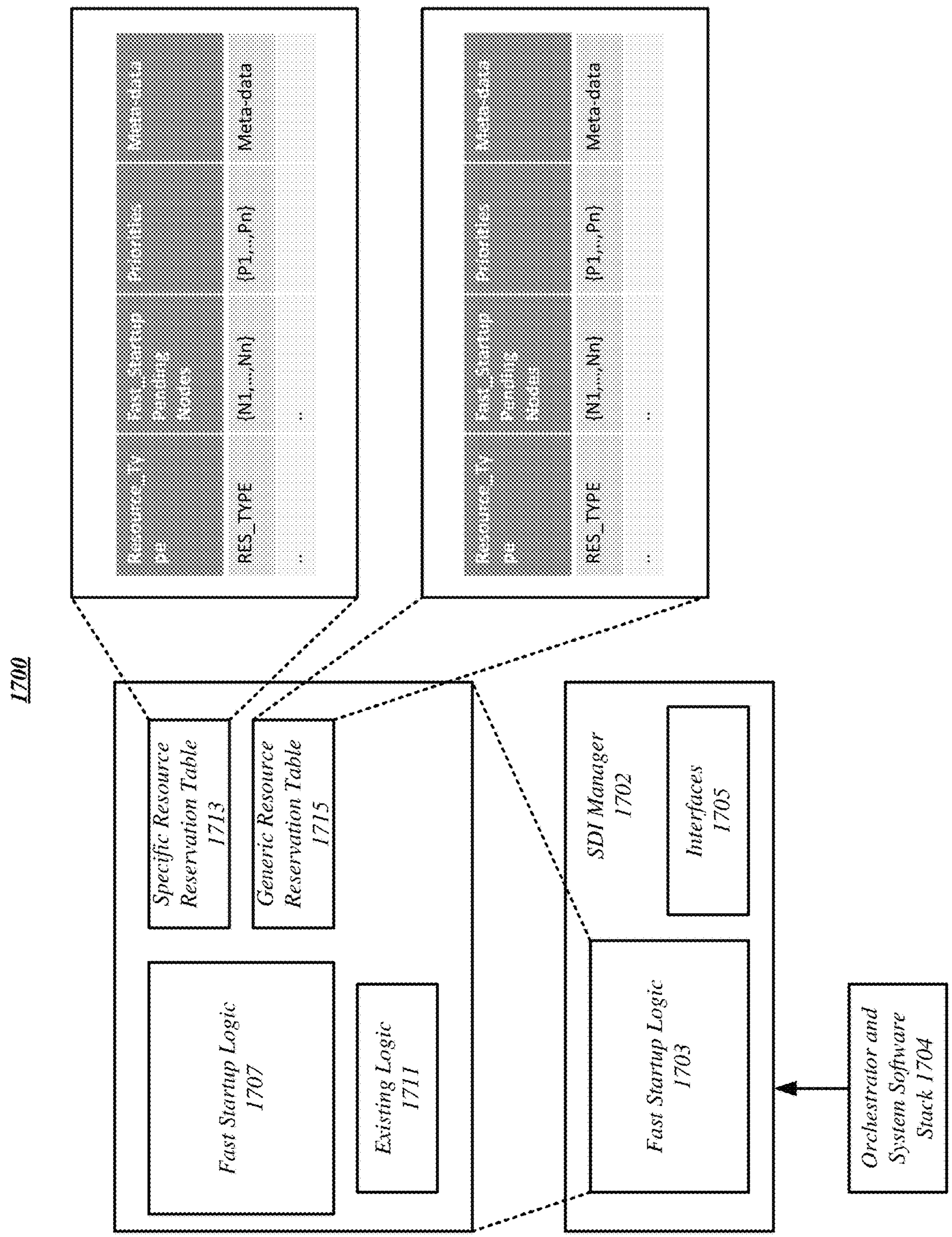
FIG. 17 illustrates a block diagram of a system according to an embodiment.

FIG. 17 illustrates a block diagram of a system according to an embodiment. System 1700 includes SDI manager 1702, which includes interfaces 1705 and fast startup logic 1703. SDI manager 1702 may include an interface 1705 that allows to the orchestration layer 1704 to specify that a fast startup can be applied for a given composite node creation request. The interface 1705 may include parameters such as, but not limited to, specifying how the fast startup needs to be performed (for example specifying a certain list of requirements that restrict what specific pools of resources are required or its physical location), Quality of Service or Service Level Agreements associate to each resource type (i.e., request disaggregated memory that is able to provide 3 GB/sec and a latency less than 300 ns), physical placement of the resources (i.e., request that all the resources of the same type are located in the same rack or the compute sleds in the same rack as the FPGA resources), and specifying what resources must be provided from the very beginning for the application to run (without these minimum resources, fast startup may be denied).

Fast startup logic 1703 may be used to implement the fast startup techniques described herein. Fast startup logic 1703 may use two reservation tables to indicate what resources (currently associated to other composite nodes) are virtually allocated for fast startup nodes and that cannot be allocated to new nodes once they are decomposed. The two tables are the generic resource reservation table 1715 and the specific resource reservation table 1713. The generic resource reservation table 1715 may store a list of resource types. In an embodiment, the resource types may be those that are virtually allocated to a composite node. Every time a resource of a given type is released it may be crossed against this table to identify if any composite node is waiting for such resource type. FIG. 17 provides a list of fields that the table may include, however, more or less may be used. Virtually allocated resources, or resource types, may be reserved using one or more tables described herein, using an indication and/or flag reserving the resource or resource type for a particular composite node.

Specific resource reservation table 1713 may store a list of specific resources. In an embodiment, the specific resources within the specific reservation table may be those that are marked as reserved for a specific fast startup node. Once these resources are released, they may be automatically bound to a specific composite node that is waiting for this resource. In this case, the fast startup may take longer to move to a complete composite node. While some exemplary field are included within the table, it can be appreciated that more or less may be used. The SDI manager 1702 may include an appropriate accounting mechanism for jobs that use fast startup. Depending upon the platform and job characteristics, the accounting mechanism may need to differ. For example, when a job was started with less memory, it may happen that it reaches a point where the memory was not enough and swapping occurred, which could have caused the application to run slower. Similarly, if the job was started with less compute resources, it could not have been as fast as it could be during the fast startup phase. Therefore, the time-limits of the job and the exact usage of resources may be accounted in a fair way according to the characteristics of a job when using the fast startup.

The orchestration layer 1704 may be extended in order to understand the concept of fast startup and to expose it to the user of the data center. Techniques described herein allows at least two different ways to implement the resource selection policies. First, orchestration based solution in which the orchestration decides exactly what physical resources are virtually allocated to the fast-startup node. This option would end up reserving resources in the specific resource reservation table 1713. This option may be less flexible, does not necessarily take the benefits of the SDI paradigm (abstracting complexity of resources), and may require more changes on the orchestration layer. Second, a SDI-based solution in which the SDI manager 602 may be responsible for determining what resources are reserved and mapped to the fast-startup node. This option may provide many advantages of what an SDI architecture provides by completely abstracting the complexity of disaggregate resource management.

In addition to the changes described above to the orchestrator, software stack changes may configure the operating system in order to allow hot plug on the new resources that are dynamically added to the fast startup composite node. If virtualization is not an option using existing hot plug capabilities, runtimes (such as MPI or OpenMP) may need to be extended in order to support this dynamic resource allocation. The interface exposed for the fast startup may be aimed to the orchestrator layer in order to make it transparently. However, the system orchestrator itself cannot trivially guess what the minimum resource requirements are that an application has. Therefore, the system orchestrator exposes methods to the application to provide it with information on requirements. This requirement information may be needed because in some cases, if the orchestrator layer is not able to correctly determine a minimum amount of resources for the application to work, it could degrade its performance (for example, not providing it with enough amount of memory for the working set that would cause constant memory swapping). If the application does not provide any resource information, it may be the responsibility of the orchestrator layer to determine when and how to use the fast startup. For example, one option could be to start immediately with the resources that can be provided at submission time, useful for systems that want to minimize TCO and know the characteristics of the jobs running. However, another valid, but very conservative option could be to mark as required from the start all the resources that the application needs (this would make it work as without fast startup).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 18:
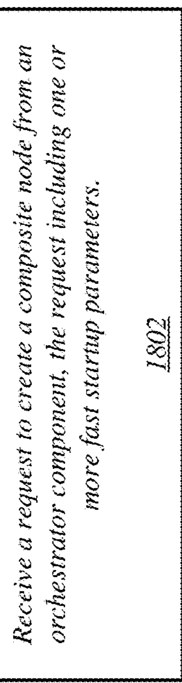
FIG. 18 illustrates a logic flow according to an embodiment.
Figure 18:
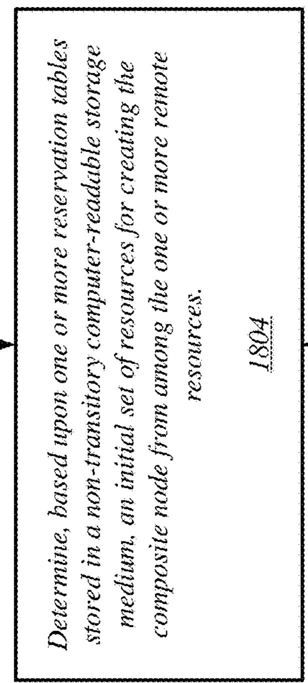
Figure 18:
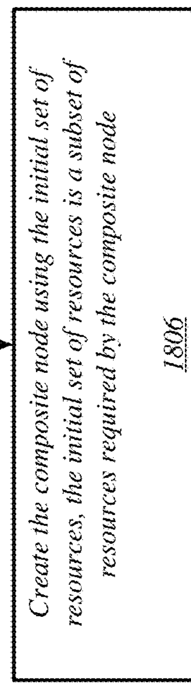

FIG. 18 illustrates a logic flow 1800 according to an embodiment. As illustrated within logic flow 1800, a SDI system, which includes an SDI manager component including one or more processor circuits, configured to access one or more remote resources, the SDI manager component including a partition manager may be configured to receive a request to create a composite node from an orchestrator component, the request including one or more fast startup parameters.

The fast startup parameters, as described herein, may include resource requirements for the composite node. The resource requirements, in some embodiments, may include one or more of quality of service or service level agreements, which may indicate resource characteristics that are needed for a composite node, or application to run on a composite node. Such characteristics may include bandwidth or latency, for example.

At 1804, the SDI manager may rely upon one or more reservation tables to determine the resources available from among the one or more remote resources. The available resources may be a subset of resources ultimately needed by an application or composite node, but enough to perform a fast startup. Two types of reservation tables may be stored on a non-transitory computer-readable storage medium of the SDI component, or remotely accessed therefrom. A generic reservation table may store a list of resources from the one or more remote resources virtually allocated to one or more composite nodes. A specific reservation table may store a list of specific resources from the one or more remote resources that have been reserved for composite nodes initialized using fast startup. The specific resources listed within the specific reservation table may automatically allocated to an associated composite node when available. For example, a memory resource may be reserved for a composite node initialized using fast startup procedures described herein. When the reserved memory resource becomes available, it may be immediately and automatically associated with the composite node, so that the fast startup composite node may reach full resource requirements.

In some embodiments, the fast startup parameters includes resource requirement from an application. For example, an application may use one or more interfaces to an orchestrator component to identify a minimum level of resources necessary to be created using the fast startup techniques describes herein. This minimum level of resources may be a subset of the resources ultimately required, however, the composite node for running an application may be able to perform some tasks, or using less than the required resources for a period of time. Resource requirements may not be passed onto an orchestrator by an application in some instances. In some embodiments, an orchestrator component may be configured to determine resource requirements for an application based upon available resources at the time of the request to create the composite node.

Using the techniques described above, at 1806, the SDI component may create the composite node using the initial set of resources, the initial set of resources being a subset of resources required by the composite node. As additional resources become available, they may be automatically associate with the composite node based upon entries within a specific reservation table identifying the remaining resources needed to fulfill the requirements of the composite node and/or application(s) running thereon.

Figure 19:
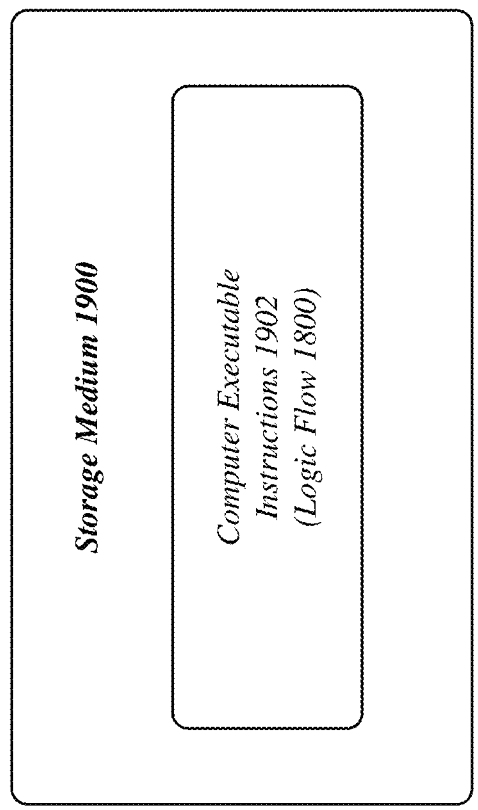
FIG. 19 illustrates an embodiment of computer-readable storage medium.

FIG. 19 illustrates an embodiment of a storage medium 1900. The storage medium 1900 may comprise an article of manufacture. In some examples, the storage medium 1900 may include any non-transitory computer readable medium or machine readable medium, such as an optical, magnetic or semiconductor storage. The storage medium 1900 may store various types of computer executable instructions e.g., 1902). For example, the storage medium 1900 may store various types of computer executable instructions to implement logic flows described herein using one or more processors and components described herein.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the disclosure.

Example 1

A software-defined infrastructure (SDI) system, comprising: an SDI manager component, including one or more processor circuits to access one or more remote resources, the SDI manager component including a node manager to: determine, based upon one or more reservation tables stored in a non-transitory computer-readable storage medium, an initial set of resources for creating the composite node from among the one or more remote resources; and create the composite node using the initial set of resources, the initial set of resources is a subset of resources required by the composite node.

Example 2

The system of Example 1, the node manager component further to receive a request to create a composite node from an orchestrator component, the request including one or more fast startup parameters, the fast startup parameters include resource requirements for the composite node.

Example 3

The Example of claim 2, wherein the resource requirements include quality of service or service level agreements indicating resource characteristics including bandwidth and latency.

Example 4

The system of Example 1, wherein the one or more reservation tables include a generic reservation table and a specific reservation table.

Example 5

The Example of claim 4, wherein the generic reservation table stores a list of resources from the one or more remote resources virtually allocated to one or more composite nodes.

Example 6

The system of Example 4, wherein the specific reservation table stores a list of specific resources from the one or more remote resources that have been reserved for composite nodes initialized using fast startup.

Example 7

The system of Example 6, wherein the specific resources listed within the specific reservation table are automatically allocated to an associated composite node when available.

Example 8

The Example of claim 2, wherein the fast startup parameters includes resource requirement from an application.

Example 9

The Example of claim 2, wherein the fast startup parameters includes resource requirement information determined by the orchestrator component.

Example 10

The Example of claim 9, wherein the resource requirement information determined by the orchestrator component is based upon available resources at the time of the request to create the composite node.

Example 11

A computer-implemented method, comprising: determining, based upon one or more reservation tables stored in a non-transitory computer-readable storage medium, an initial set of resources for creating the composite node from among the one or more remote resources; and creating the composite node using the initial set of resources, the initial set of resources is a subset of resources required by the composite node.

Example 12

The method of Example 11, further comprising receiving a request to create a composite node from an orchestrator component, the request including one or more fast startup parameters, the fast startup parameters include resource requirements for the composite node.

Example 13

The method of Example 12, wherein the resource requirements include quality of service or service level agreements indicating resource characteristics including bandwidth and latency.

Example 14

The method of Example 11, wherein the one or more reservation tables include a generic reservation table and a specific reservation table.

Example 15

The method of Example 14, further comprising: detecting that a resource has been released; determining whether the released resource is of a type listed within the generic reservation table associated with the composite node; allocating the resource to the composite node; and updating the generic reservation table to indicate that the composite node has received the allocated resource.

Example 16

The method of Example 14, wherein the specific reservation table stores a list of specific resources from one or more remote resources that have been reserved for composite nodes initialized using fast startup.

Example 17

The method of Example 16, wherein the specific resources listed within the specific reservation table are automatically allocated to an associated composite node when available.

Example 18

The method of Example 11, wherein the fast startup parameters includes resource requirement from an application.

Example 19

The method of Example 11, wherein the fast startup parameters includes resource requirement information determined by the orchestrator component.

Example 20

The method of Example 19, wherein the resource requirement information determined by the orchestrator component is based upon available resources at the time of the request to create the composite node.

Example 21

An article comprising a non-transitory computer-readable storage medium that stores instructions for execution by processing circuitry of a software-defined infrastructure (SDI) system, the instructions to cause a SDI manager component of the SDI system to: determine, based upon one or more reservation tables stored in a non-transitory computer-readable storage medium, an initial set of resources for creating the composite node from among the one or more remote resources; and create the composite node using the initial set of resources, the initial set of resources is a subset of resources required by the composite node.

Example 22

The article of Example 21, further comprising receiving a request to create a composite node from an orchestrator component, the request including one or more fast startup parameters, the fast startup parameters include resource requirements for the composite node.

Example 23

The article of Example 22, wherein the resource requirements include quality of service or service level agreements indicating resource characteristics including bandwidth and latency.

Example 24

The article of Example 21, wherein the one or more reservation tables include a generic reservation table and a specific reservation table.

Example 25

The article of Example 24, wherein the generic reservation table stores a list of resources from the one or more remote resources virtually allocated to one or more composite nodes.

Example 26

The article of Example 24, wherein the specific reservation table stores a list of specific resources from one or more remote resources that have been reserved for composite nodes initialized using fast startup.

Example 27

The article of Example 26, wherein the specific resources listed within the specific reservation table are automatically allocated to an associated composite node when available.

Example 28

The article of Example 21, wherein the fast startup parameters includes resource requirement from an application.

Example 29

The article of Example 21, wherein the fast startup parameters includes resource requirement information determined by the orchestrator component.

Example 30

The article of Example 29, wherein the resource requirement information determined by the orchestrator component is based upon available resources at the time of the request to create the composite node.

Example 31

A software-defined infrastructure (SDI) system, comprising: means for determining, based upon one or more reservation tables stored in a non-transitory computer-readable storage medium, an initial set of resources for creating the composite node from among the one or more remote resources; and means for creating the composite node using the initial set of resources, the initial set of resources is a subset of resources required by the composite node.

Example 32

The system of Example 31, further comprising receiving a request to create a composite node from an orchestrator component, the request including one or more fast startup parameters, the fast startup parameters include resource requirements for the composite node.

Example 33

The system of Example 32, wherein the resource requirements include quality of service or service level agreements indicating resource characteristics including bandwidth and latency.

Example 34

The system of Example 31, wherein the one or more reservation tables include a generic reservation table and a specific reservation table.

Example 35

The system of Example 34, wherein the generic reservation table stores a list of resources from one or more remote resources virtually allocated to one or more composite nodes.

Example 36

The system of Example 34, wherein the specific reservation table stores a list of specific resources from one or more remote resources that have been reserved for composite nodes initialized using fast startup.

Example 37

The system of Example 36, wherein the specific resources listed within the specific reservation table are automatically allocated to an associated composite node when available.

Example 38

The system of Example 31, wherein the fast startup parameters includes resource requirement from an application.

Example 39

The system of Example 31, wherein the fast startup parameters includes resource requirement information determined by the orchestrator component.

Example 40

The system of Example 39, wherein the resource requirement information determined by the orchestrator component is based upon available resources at the time of the request to create the composite node.

Example 41

An apparatus, comprising: at least one memory; at least one processor; and logic, at least a portion of the logic comprised in hardware and executed by the at least one processor, the logic to: determine, based upon one or more reservation tables stored in a non-transitory computer-readable storage medium, an initial set of resources for creating the composite node from among the one or more remote resources; and create the composite node using the initial set of resources, the initial set of resources is a subset of resources required by the composite node.

Example 42

The apparatus of Example 41, further comprising receiving a request to create a composite node from an orchestrator component, the request including one or more fast startup parameters, the fast startup parameters include resource requirements for the composite node.

Example 43

The apparatus of Example 42, wherein the resource requirements include quality of service or service level agreements indicating resource characteristics including bandwidth and latency.

Example 44

The apparatus of Example 41, wherein the one or more reservation tables include a generic reservation table and a specific reservation table.

Example 45

The apparatus of Example 44, wherein the generic reservation table stores a list of resources from one or more remote resources virtually allocated to one or more composite nodes.

Example 46

The apparatus of Example 44, wherein the specific reservation table stores a list of specific resources from one or more remote resources that have been reserved for composite nodes initialized using fast startup.

Example 47

The apparatus of Example 46, wherein the specific resources listed within the specific reservation table are automatically allocated to an associated composite node when available.

Example 48

The apparatus of Example 41, wherein the fast startup parameters includes resource requirement from an application.

Example 49

The apparatus of Example 41, wherein the fast startup parameters includes resource requirement information determined by the orchestrator component.

Example 50

The apparatus of Example 49, wherein the resource requirement information determined by the orchestrator component is based upon available resources at the time of the request to create the composite node.

The invention claimed is:

1. A software-defined infrastructure (SDI) system, comprising:

an SDI manager component, including one or more processor circuits to access one or more remote resources, the SDI manager component including a node manager to:

determine, based upon one or more reservation tables stored in a non-transitory computer-readable storage medium, an initial set of resources for a composite node from among the one or more remote resources, wherein the one or more reservation tables include a generic reservation table and a specific reservation table; and create the composite node using the initial set of resources, wherein the initial set of resources is a subset of resources to be allocated to the composite node.

2. The system of claim 1, the node manager further to receive a request to create a composite node from an orchestrator component, the request including one or more fast startup parameters, the fast startup parameters include resource requirements for the composite node.

3. The system of claim 2, wherein the resource requirements include quality of service or service level agreements indicating resource characteristics including bandwidth and latency.

4. The system of claim 2, wherein the generic reservation table stores a list of resource types virtually allocated to one or more composite nodes.

5. The system of claim 2, wherein the specific reservation table stores a list of specific resources from the one or more remote resources that have been reserved for composite nodes initialized using fast startup.

6. The system of claim 5, wherein the specific resources listed within the specific reservation table are automatically allocated to an associated composite node when available.

7. The system of claim 2, wherein the fast startup parameters includes resource requirement from an application.

8. The system of claim 2, wherein the fast startup parameters includes resource requirement information determined by the orchestrator component.

9. The system of claim 8, wherein the resource requirement information determined by the orchestrator component is based upon available resources at a time of the request to create the composite node.

10. A computer-implemented method, comprising:

determining, based upon one or more reservation tables stored in a non-transitory computer-readable storage medium, an initial set of resources for creating a composite node from one or more remote resources, wherein the one or more reservation tables include a generic reservation table and a specific reservation table; and creating the composite node using the initial set of resources, wherein the initial set of resources is a subset of resources to be allocated to the composite node.

11. The method of claim 10, further comprising receiving a request to create a composite node from an orchestrator component, the request including one or more fast startup parameters, the fast startup parameters include resource requirements for the composite node.

12. The method of claim 11, wherein the resource requirements include quality of service or service level agreements indicating resource characteristics including bandwidth and latency.

13. The method of claim 11, further comprising:

detecting that a resource has been released;

determining whether the released resource is of a type listed within the generic reservation table associated with the composite node;

allocating the resource to the composite node; and updating the generic reservation table to indicate that the composite node has received the allocated resource.

14. The method of claim 11, wherein the specific reservation table stores a list of specific resources from one or more remote resources that have been reserved for composite nodes initialized using fast startup.

15. The method of claim 14, wherein the specific resources listed within the specific reservation table are automatically allocated to an associated composite node when available.

16. The method of claim 11, wherein the fast startup parameters include resource requirements from an application.

17. The method of claim 11, wherein the fast startup parameters include resource requirement information determined by the orchestrator component.

18. The method of claim 17, wherein the resource requirement information determined by the orchestrator component is based upon available resources at a time of the request to create the composite node.

19. A non-transitory computer-readable storage medium that stores instructions for execution by processing circuitry of a software-defined infrastructure (SDI) system, the instructions to cause a SDI manager component of the SDI system to:

determine, based upon one or more reservation tables stored in a non-transitory computer-readable storage medium, an initial set of resources for creating a composite node from one or more remote resources, wherein the one or more reservation tables include a generic reservation table and a specific reservation table; and create the composite node using the initial set of resources, wherein the initial set of resources is a subset of resources to be allocated to the composite node.

20. The non-transitory computer-readable storage medium of claim 19, wherein the specific reservation table stores a list of specific resources from one or more remote resources that have been reserved for composite nodes initialized using fast startup, and the specific resources listed within the specific reservation table are automatically allocated to an associated composite node when available.

21. A software-defined infrastructure (SDI) system, comprising:

means for determining, based upon one or more reservation tables stored in a non-transitory computer-readable storage medium, an initial set of resources for creating a composite node from one or more remote resources, wherein the one or more reservation tables include a generic reservation table and a specific reservation table; and means for creating the composite node using the initial set of resources, wherein the initial set of resources is a subset of resources to be allocated to the composite node.

22. The system of claim 21, further comprising:

means for detecting that a resource has been released;

means for determining whether the released resource is of a type listed within the generic reservation table associated with the composite node;

means for allocating the resource to the composite node; and means for updating the generic reservation table to indicate that the composite node has received the allocated resource.

23. The system of claim 21, wherein the specific reservation table stores a list of specific resources from one or more remote resources that have been reserved for composite nodes initialized using fast startup, and the specific resources listed within the specific reservation table are automatically allocated to an associated composite node when available.

* * * * *